United States Patent
Mossman et al.

(10) Patent No.: US 9,538,708 B2
(45) Date of Patent: Jan. 10, 2017

(54) FINGER SUPPORT FOR A DRUM CONVEYOR

(71) Applicant: Deere & Company, Moline, IL (US)

(72) Inventors: Michael W Mossman, Silvis, IL (US); Matthew R White, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/468,715

(22) Filed: Aug. 26, 2014

(65) Prior Publication Data

US 2016/0057932 A1    Mar. 3, 2016

(51) Int. Cl.
| | | |
|---|---|---|
| *B65G 19/00* | (2006.01) | |
| *B65G 35/00* | (2006.01) | |
| *B65G 13/02* | (2006.01) | |
| *A01D 57/01* | (2006.01) | |
| *A01D 57/00* | (2006.01) | |
| *A01D 61/00* | (2006.01) | |
| *A01D 47/00* | (2006.01) | |

(52) U.S. Cl.
CPC ............. *A01D 57/01* (2013.01); *A01D 47/00* (2013.01); *A01D 57/00* (2013.01); *A01D 61/008* (2013.01)

(58) Field of Classification Search
None
See application file for complete search history.

(56) References Cited

U.S. PATENT DOCUMENTS

| | | | | |
|---|---|---|---|---|
| 2,701,634 A | | 2/1955 | Thomas | |
| 2,803,505 A | | 8/1957 | Oberholtz | |
| 4,254,609 A | * | 3/1981 | van der Lely | A01D 78/1078 56/365 |
| 4,297,760 A | * | 11/1981 | Olivari | E01H 1/045 15/79.1 |
| 4,879,034 A | * | 11/1989 | Bastgen | B01D 33/042 100/118 |
| 5,813,205 A | * | 9/1998 | Gosa | A01D 61/008 56/341 |
| 6,986,241 B2 | * | 1/2006 | Beck | A01D 89/002 56/12.4 |
| 2013/0291510 A1 | | 11/2013 | Lovett | |

OTHER PUBLICATIONS

European Search Report in foreign counterpart application No. 15176393 dated Jan. 28, 2016 (7 pages).

* cited by examiner

*Primary Examiner* — Kavel Singh

(57) ABSTRACT

A finger support (204) for a drum conveyor (112), the drum conveyor (112) comprising an elongate drum (122) that is hollow and a plurality of fingers (124), wherein the plurality of fingers (124) are supported at one end within the elongate drum (122) and extend outward through apertures in a wall of the elongate drum (122), the finger support (204), the finger support (204) comprising a base plate (300) configured to be mounted on a surface of the elongate drum (122); a cover plate (304) fixed to the base plate (300); and a swivel member (302) disposed between the base plate (300) and a cover plate (304); wherein the swivel member (302) is constrained by the base plate (300) and the cover plate (304) to rotate with respect to the base plate (300) and the cover plate (304) about an axis (318).

9 Claims, 4 Drawing Sheets

FINGER SUPPORT FOR A DRUM CONVEYOR

FIELD OF THE INVENTION

The invention relates to agricultural harvesting machines. More particularly it relates to agricultural harvesting heads. Even more particularly, it relates to conveyors for conveying cut crop material in agricultural harvesting heads.

BACKGROUND

Agricultural harvesting heads are devices that are carried to the field to sever a swath of crop plants from the ground and gather the severed crop plants together, either to be returned to the field in a windrow or to be conveyed into a crop harvesting machine.

In a typical arrangement, the crop material is severed by an elongate reciprocating knife that extends across the width of the agricultural harvesting head to sever the crop plants near their roots. The crop plants are then directed onto one or more lateral conveyors that carry them to a central region of the agricultural harvesting head. The cut crop material, now gathered together, is then conveyed rearward by means of one or more conveyors.

One arrangement used to convey the crops rearward is a rotating drum conveyor with protruding fingers. The protruding fingers engage the crop mat and pull it rearward underneath the rotating drum of the rotating drum conveyor. The fingers are attached to a stationary member about which the rotating drum rotates. The stationary member is inside the rotating drum and offset from the rotational axis of the rotating drum. The fingers are supported on bearings mounted on the stationary member and extend through holes in the drum and are a rotated by the drum as the drum is driven in rotation. Since the stationary member is offset, the fingers change their angle with respect to the surface of the rotating drum at the same time that they slide in and out of the drum.

The gap between the holes in the drum through which the fingers extend and the fingers themselves must be small in order to prevent crop material from becoming drawn into the rotating drum as the fingers retract into the rotating drum. In one prior art arrangement, the holes in the rotating drum support spherical plastic balls. These spherical plastic balls have a hole that passes through them that in turn supports the fingers as they slide in and out of the rotating drum. As the fingers change their angle with respect to the rotating drum, the spherical balls accommodate this changing angle by rotating with respect to the surface of the rotating drum (to which they are attached).

This arrangement is prone to wear. What is needed is an arrangement for supporting the fingers at the surface of the rotating drum that is less prone to wear. It is an object of this invention to provide such an arrangement.

SUMMARY OF THE INVENTION

In accordance with a first aspect of the invention, a finger support for a drum conveyor, the drum conveyor comprising an elongate drum that is hollow and a plurality of fingers, wherein the plurality of fingers are supported at one end within the elongate drum and extend outward through apertures in a wall of the elongate drum, the finger support comprising: a base plate configured to be mounted on a surface of the elongate drum; a cover plate fixed to the base plate; and a swivel member disposed between the base plate and a cover plate; wherein the swivel member is constrained by the base plate and the cover plate to rotate with respect to the base plate and the cover plate about an axis.

The swivel member may be in the form of an elongate body comprising a central region, an end region, and an opposite end region.

The central region may define an aperture configured to receive and support one of the plurality of fingers.

The end region and the opposite end region may be disposed at opposite ends of the central region.

The base plate may comprise a first cradle and the cover plate may comprise a second cradle and the end region may be fixed between the first cradle and the second cradle.

The base plate may comprise a third cradle and the cover plate may comprise a fourth cradle, and the opposite end region may be fixed between the third cradle and the fourth cradle.

The elongate drum may be configured to rotate in a first direction, and the axis may be parallel to the first direction.

At least one of the base plate, the swivel member, and the cover plate may comprise plastic.

The swivel member may comprise plastic.

The base plate may comprise plastic.

The finger support may be fixed to a conical end portion of the elongate drum, and the finger support may support a finger of the plurality of fingers that is disposed at an angle with respect to a rotational axis of the elongate drum and the angle may be acute throughout an entire rotation of the elongate drum and vary continuously between two angular limits as the elongate drum rotates.

The angle may be smallest when the finger support faces forward, and the angle may be largest when the finger support faces rearward.

DETAILED DESCRIPTION

Figure 1:
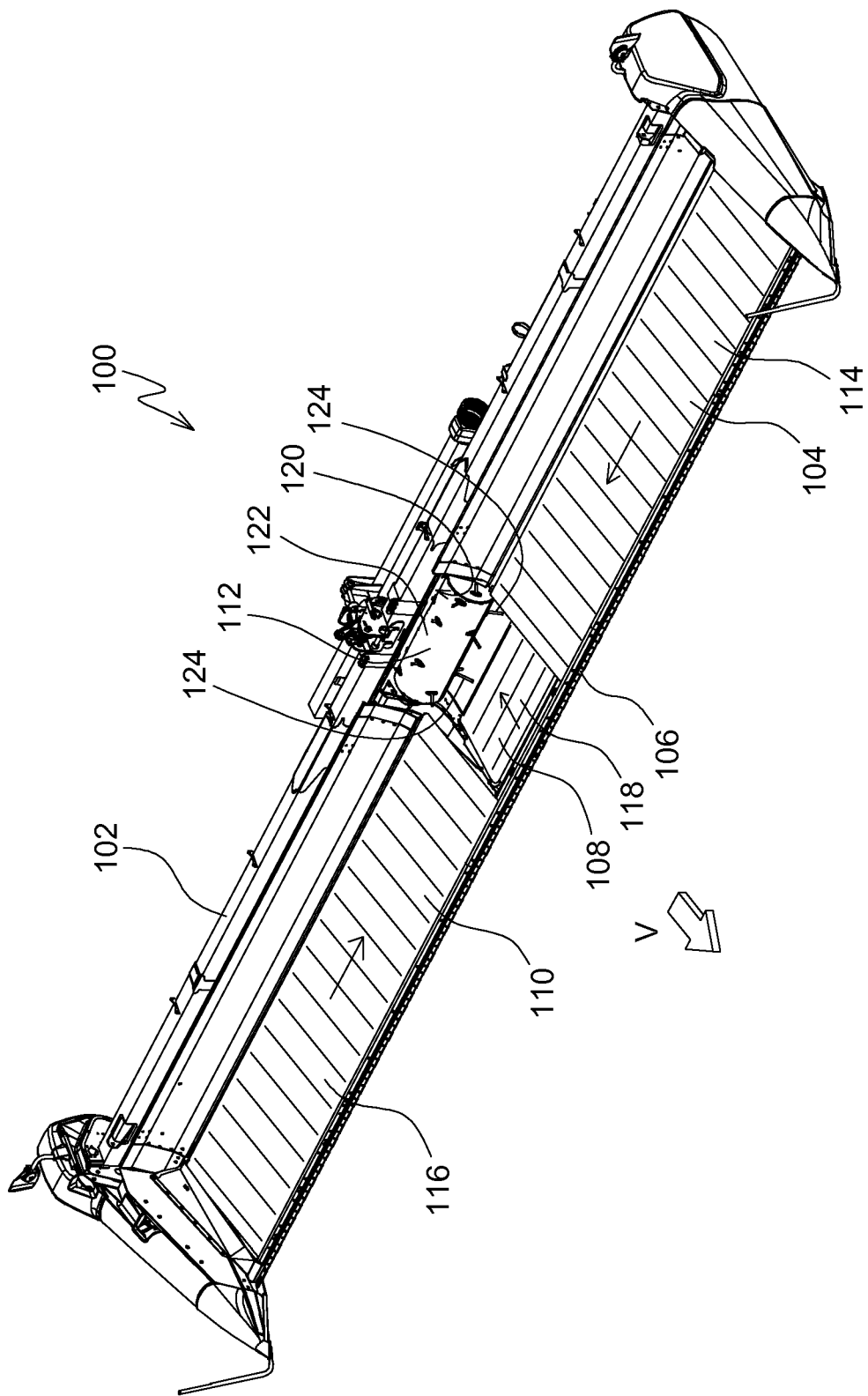
FIG. 1 is a perspective view of an agricultural harvesting head in accordance with the present invention.

Referring to FIG. 1, an agricultural harvesting head 100 comprises an elongate frame 102, a left side conveyor 104, an elongate reciprocating knife 106, a center conveyor 108, a right side conveyor 110, and a drum conveyor 112.

The agricultural harvesting head 100 extends laterally with respect to the direction of travel "V" of the agricultural harvesting head 100 as it travels through the field harvesting crops.

The elongate frame 102 extends substantially the entire width of the agricultural harvesting head 100.

The left side conveyor 104 extends laterally over substantially the entire left side of the agricultural harvesting head 100. The left side conveyor 104 comprises an endless belt 114 supported on rollers (not shown) and is driven inwardly toward the center of the agricultural harvesting head 100 in the direction indicated by the arrow superimposed on the left side conveyor 104. The left side conveyor 104 conveys cut crop material to a central region of the agricultural harvesting head 100. The left side conveyor 104 is supported on the elongate frame 102.

The right side conveyor 110 extends laterally over substantially the entire right side of the agricultural harvesting head 100. The right side conveyor 110 comprises an endless belt 116 supported on rollers (not shown) and is driven inwardly toward the center of the agricultural harvesting head 100 in the direction indicated by the arrow superimposed on the right side conveyor 110. The right side conveyor 110 conveys cut crop material to a central region of the agricultural harvesting head 100. The right side conveyor 110 is supported on the elongate frame 102.

The elongate reciprocating knife 106 extends substantially the entire width of the agricultural harvesting head 100. It is supported on the elongate frame 102. It is disposed at a forward edge of the agricultural harvesting head 100 and is configured to sever the stalks of crop plants near their roots. When cut, the crop material falls rearward on to the left side conveyor 104, the right side conveyor 110, and the center conveyor 108.

The center conveyor 108 is supported on the elongate frame 102. It comprises an endless belt 118 that is supported on rollers (not shown) and is driven rearwardly toward an aperture 120 in the rear wall of the elongate frame 102. The center conveyor 108 receives cut crop material from the elongate reciprocating knife 106 in front of the center conveyor 108. It also receives cut crop material from the left side conveyor 104 and the right side conveyor 110. The center conveyor 108 carries this crop material rearward toward the aperture 120.

The drum conveyor 112 extends laterally parallel to the longitudinal extent of the agricultural harvesting head 100. The drum conveyor 112 comprises an elongate drum 122, a plurality of fingers 124, and an elongate member (not shown) disposed inside the elongate drum 122 on which the inner ends of the plurality of fingers 124 are supported for rotation. The drum conveyor 112 is driven in a counterclockwise direction (in FIG. 1) such that cut crop material conveyed rearwardly by the center conveyor 108 is pulled underneath the drum conveyor 112 and further rearward into the aperture 120. The plurality of fingers 124 sweep downward and engage the cut crop material, compressing it underneath the drum conveyor 112 and draw the cut crop material rearward.

Figure 2:
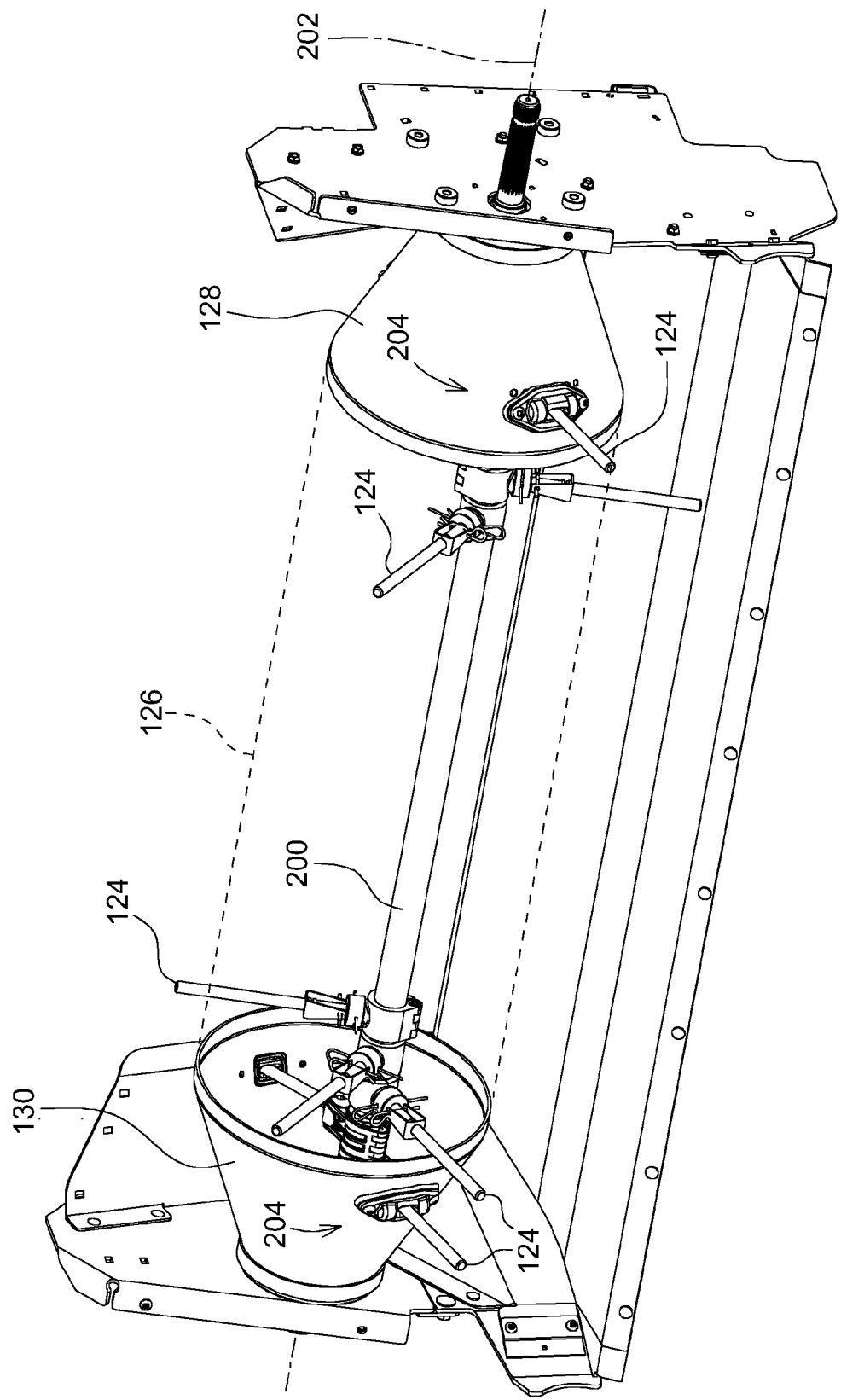
FIG. 2 is a fragmentary detail perspective view of a drum conveyor of the agricultural harvesting head of FIG. 1.

Referring to FIG. 2, the elongate drum 122 comprises a center portion 126 (shown in phantom lines) that is a right circular cylinder, a left portion 128 that is conical, and a right portion 130 that is conical. The left portion 128 and the right portion 130 are fixed to opposite ends of the center portion 126 to give the elongate drum 122 a tapering cigar shape. The plurality of fingers 124 extends through apertures in a surface 329 of the elongate drum 122. The plurality of fingers 124 are supported on their inner ends on an elongate member 200. The elongate member 200 is stationary, and the plurality of fingers 124 is supported on the elongate member 200 for free rotation about the circumference of the elongate member 200. The elongate member 200 is located along a horizontal axis 201 extending parallel to a rotational axis 202 of the elongate drum 122. The horizontal axis 201 is in a horizontal plane containing the rotational axis 202 and is offset from the axis 202 in the direction of travel V by a distance D (see FIG. 4). In this manner, as the elongate drum 122 rotates, the elongate drum 122 pushes against the shanks of each of the plurality of fingers 124 and causes each of the plurality of fingers 124 to rotate about the elongate member 200 as the elongate drum 122 rotates. Because the elongate member 200 is offset from the rotational axis 202, the fingers 124 are alternatively extended from and retracted into the drum as the elongate drum 122 rotates. The plurality of fingers 124 extend through apertures in the center portion 126, the left portion 128, and the right portion 130. The sliding shank of each of the plurality of fingers 124 is supported on a finger support 204, which is fixed to the surface 329 of the elongate drum 122. Each finger support 204 supports the shank of a corresponding finger 124 of the plurality of fingers 124 and communicates the rotating force of the drum to that corresponding finger 124, causing it to rotate.

Figure 3:
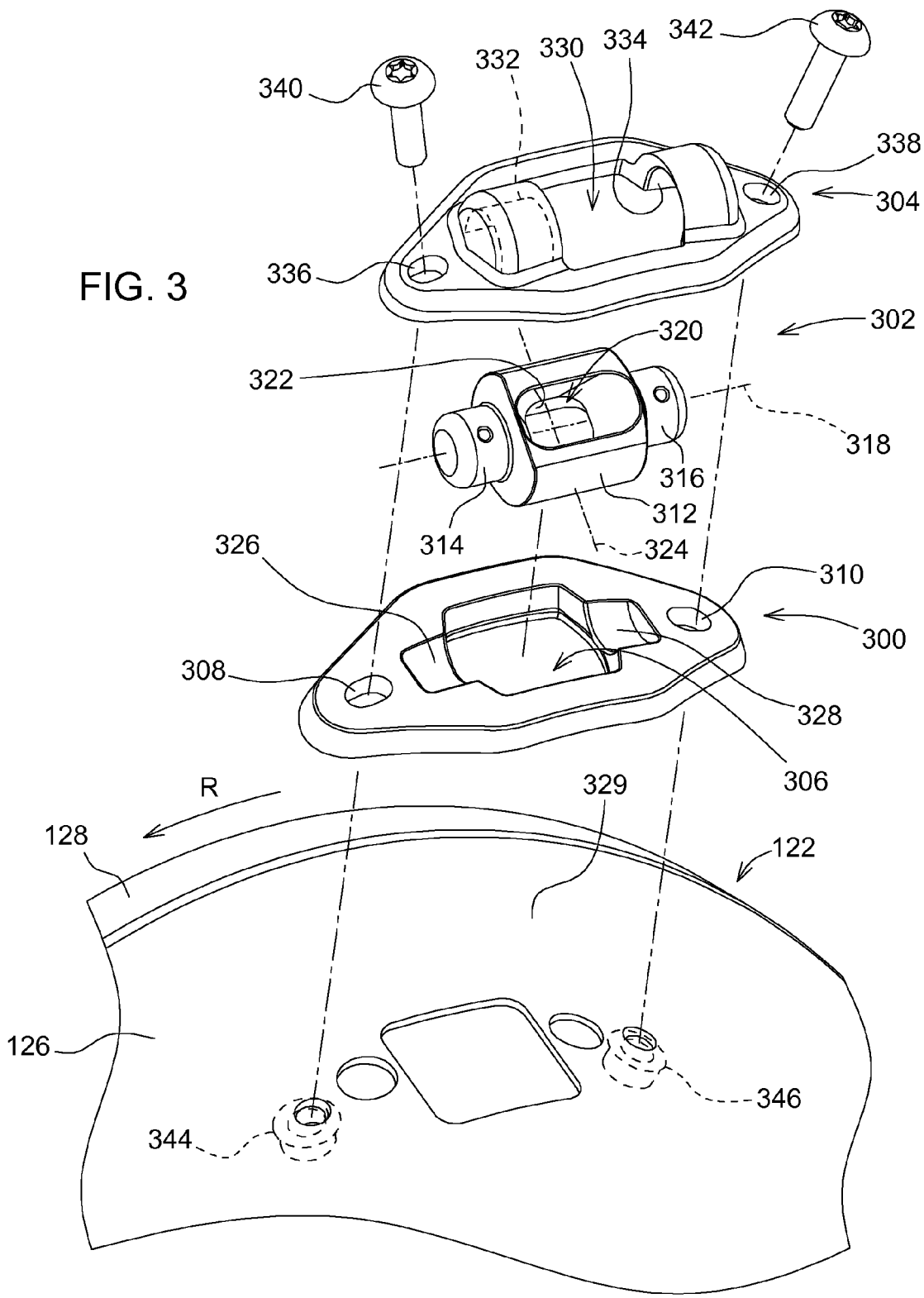
FIG. 3 is an exploded view of a finger support of the drum conveyor shown in FIG. 2.

Referring to FIG. 3, the finger support 204 comprises a base plate 300, as swivel member 302, and a cover plate 304.

When fixed to the elongate drum 122, the base plate 300 abuts a surface 329 of the elongate drum 122. It has a central aperture 306 that receives and supports the swivel member 302. The base plate 300 has a first mounting hole 308 disposed in front of the swivel member 302 in a direction of rotation "R" of the elongate drum 122. The base plate has a second mounting hole 310 disposed behind the swivel member 302 in the direction of rotation "R". The first mounting hole 308 and the second mounting hole 310 are disposed at opposing ends of the swivel member 302.

The swivel member 302 has the general form of an elongate cylinder. It comprises a central cylindrical region 312, an end region 314 and an opposing end region 316. Each of the three regions is generally circular and shares a central axis 318. The central axis 318 extends in a direction tangential to the direction of rotation "R".

The swivel member 302 has an elongate slot 320 that passes through the center of the central cylindrical region 312 and extends generally parallel to the central axis 318. The elongate slot 320 tapers inwardly from both ends and from both opposing sides of the central cylindrical region 312 until it forms a generally circular hole 322 in the middle of the central cylindrical region 312. This hole is substantially the same diameter as the shank of the finger 124 that passes through and is supported by the finger support 204. By this arrangement, the finger 124 can pivot about an axis 324 with respect to the swivel member 302 that is normal to and intersects the central axis 318.

The end region 314 of the swivel member 302 is supported in a cradle 326 defined in the outer surface of the base plate 300. In a similar fashion, the opposite end region 316 of the swivel member 302 is supported in a cradle 328 that is also defined in the outer surface of the base plate 300. Whenever the finger 124 supported by the finger support 204 pivots about the central axis 318, it abuts opposing sides of the elongate slot 320 and causes the swivel member 302 to pivot about the central axis 318 together with the finger 124 in cradle 326 and cradle 328.

In this manner, the elongate slot 320 permits the finger 124 to pivot about the axis 324, and the cradle arrangement permits the finger 124 to pivot about the orthogonal central axis 318. Pivoting about the two orthogonal axes 318, 324 permits the finger 124 to swivel with respect to the surface 329 of the elongate drum 122 as the elongate drum 122 drives the finger 124 in rotation about the elongate member 200.

The cover plate 304 is configured similar to and functions substantially the same as the base plate 300. It has a central hole 330, a cradle 332 at one end of the central hole 330, and a cradle 334 at the opposing end of the central hole 330. Cradle 332 and cradle 326 work together to surround and support the end region 314. Cradle 334 and cradle 328 work together to surround and support the opposing end region 316. The finger 124 that is supported by the finger support 204 passes through the central hole 330. When the assembly is attached to the surface 329 of the elongate drum 122, the swivel member 302 is sandwiched between the base plate 300 and the cover plate 304 and is held in position on the surface 329 of the elongate drum 122. The cradle arrangement permits the swivel member 302 to rotate about the central axis 318 without being detached from the surface 329 of the elongate drum 122.

The cover plate 304 has a first mounting hole 336 disposed in front of the swivel member 302 parallel to a direction of rotation "R" of the elongate drum 122. The base plate 300 has a second mounting hole 338 disposed behind the swivel member 302 in the direction of rotation "R". The first mounting hole 336 and the second mounting hole 338 are disposed at opposing ends of the swivel member 302.

The finger support 204 is fixed to the surface 329 of the elongate drum 122 with a fastener 340 and a fastener 342. Fastener 340 extends through first mounting hole 336 of the cover plate 304 then through first mounting hole 308 of the base plate 300 and then into a mating fastener 344. The mating fastener 344 is disposed on an inner surface 329 of the elongate drum 122. Fastener 342 extends through the second mounting hole 338 of the cover plate 304, then through the second mounting hole 310 of the base plate 300, and then into a mating fastener 346. The mating fastener 346 is disposed on the inner surface of the elongate drum 122.

Tightening the fastener 340 and the fastener 342 compresses the cover plate 304 against the base plate 300 and compresses both the cover plate 304 and the base plate 300 against the outer surface 329 of the elongate drum 122. In dismounted position, the swivel member 302 is held between the cover plate 304 and the base plate 300 but is still permitted to rotate about the axis 318.

In one arrangement, the fastener 340 and the fastener 342 are removable threaded fasteners such as screws or bolts. This arrangement permits the finger support 204 to be rapidly removed, repaired, and replaced when worn.

In one arrangement, the base plate 300 and the cover plate 304 are made of metal such as steel, iron, or aluminum alloy. In another arrangement, the base plate 300 and the cover plate 304 are made of injection molded plastic, such as a thermoplastic (for example a fiber enforced plastic, high density polyethylene or nylon) or a thermoset. In one arrangement the lower surface of base plate 300 that is in contact with the surface 329 of the elongate drum 122 is curved to match the curvature of the surface 329 before installation. In this manner, the base plate 300 is not deformed when it is attached to the elongate drum 122 and does not cause the swivel member 302 to bind in the cradles 326, 328, 332, and 334 when fasteners 340, 342 are tightened.

Figure 4:
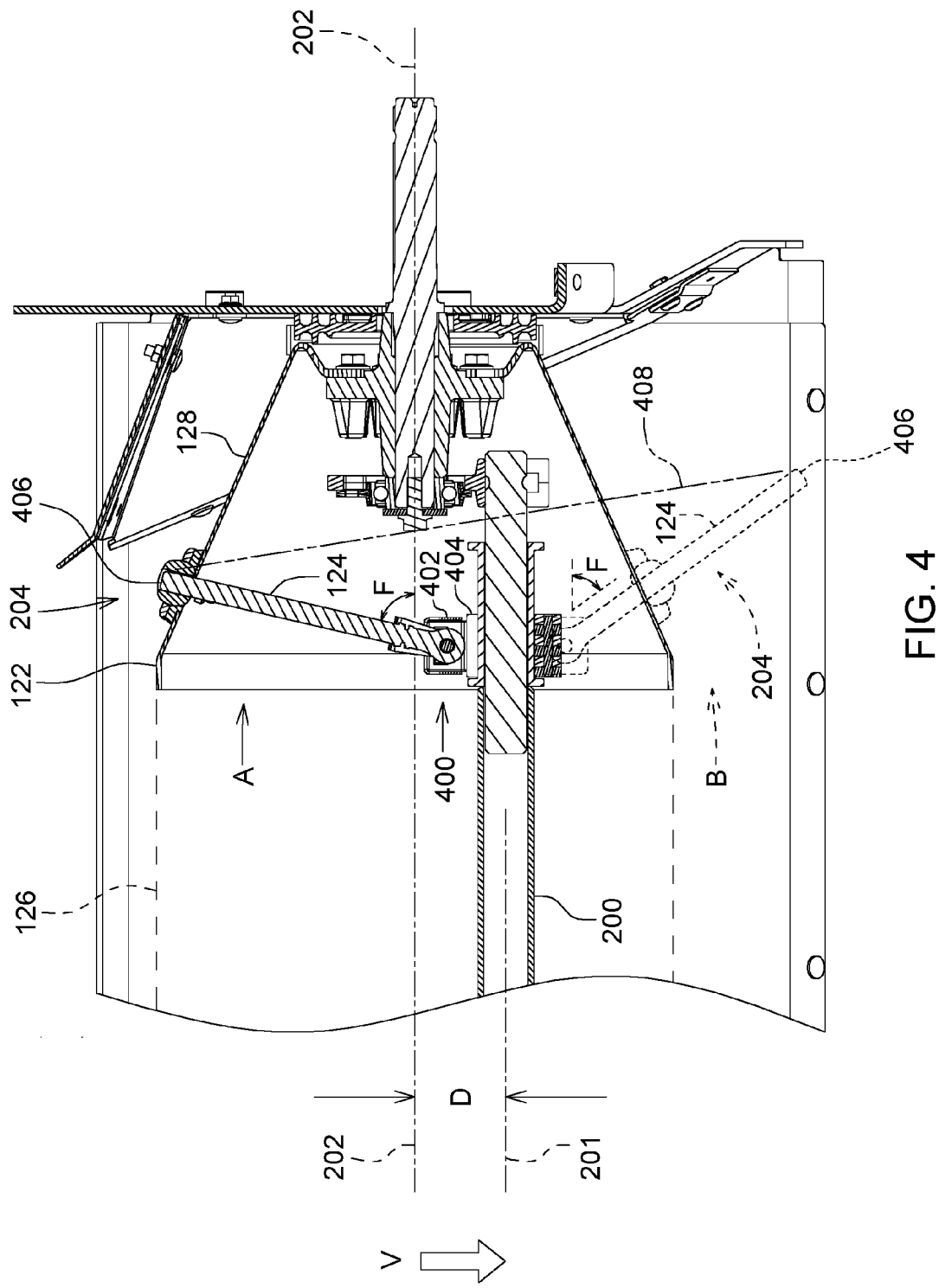
FIG. 4 is a fragmentary horizontal cross-sectional view of the left end of the drum conveyor with some of the finders being removed.

FIG. 4 illustrates the operation and movement of a typical finger 124 as the elongate drum 122 rotates. The finger 124 is shown in two positions: a rear position "A" and a front position "B". In the rear position "A", the offset "D" of the elongate member 200 has caused the finger 124 to be retracted substantially entirely into the elongate drum 122. In the front position "B" the offset "D" of the elongate member 200 has caused the finger 124 to be substantially extended from the elongate drum 122. The finger 124 is mounted at its inner end 400 to a finger mount 402 that is supported on a bearing 404 on elongate member 200. Bearing 404 permits the finger mount 402 to rotate freely about the elongate member 200 but constrains it from translating along elongate member 200. The finger 124 is disposed at an acute angle "F" with respect to the rotational axis 202 of the elongate drum 122. As the elongate drum 122 rotates 180° so the finger 124 is in the front position "B", the acute angle "F" continually changes, reducing acute angle "F". As the angle of finger 124 with respect to the surface 329 of elongate drum 122 changes, the shank of the finger 124 abutting the sidewalls of the swivel member 302 causes swivel member 302 to rotate about its central axis 318, thereby accommodating the movement of the finger 124.

Finger 124 extends through the conical outer surface of the left portion 128 and is angled outwardly. This causes the outer end 406 of the finger 124 to follow path 408, starting from the fingers forwardmost position (position "B") and thereby pull the cut crop material downward under the elongate drum 122 and inward towards the longitudinal center of the elongate drum 122. The acute angle "F" is smallest when the finger 124 faces forward, and thus extends farthest outward toward the incoming crop to engage as much of the crop mat as possible.

As the finger 124 rotates downward and then rearward, the acute angle "F" gradually increases, thus pivoting the outer end of the finger 124 inwardly, more toward the longitudinal center of the elongate drum 122. This effectively gathers the crop mat together toward a more central region of the elongate drum 122.

Eventually the finger 124 reaches its rearmost position, facing backward, (position "A") at which point the finger 124 has been withdrawn and the now-gathered crop mat is released, and at which point the acute angle "F" is largest.

As the finger continues in its circular movement around the axis 202 it rotates back forward across the top of the elongate drum 122, gradually extending outward from the surface of the elongate drum 122 as the acute angle "F" continually decreases and this process continues until the finger 124 reaches its forwardmost position, facing forward, (position "B") at which the acute angle "F" is smallest, and the finger 124 is extended outward from the surface of the elongate drum 122 to its greatest extent.

While only one finger 124 is shown in FIG. 4, the arrangement of fingers 124 on the right portion 130 at the other end of the elongate drum 122 is an identical mirror image to the arrangement of fingers 124 on the left portion 128. Therefore, as the fingers 124 on the left portion 128 pull the cut crop material toward the right, the identical fingers 124 on the right portion 130 pull the cut crop material toward the left.

The invention is not limited to the specific arrangements illustrated and/or described in this document. The specific arrangements merely illustrate one manner of making the invention. The invention itself, however, is defined by the claims.

In further arrangements other than the specific arrangements illustrated and/or described in this document, the finger support 204 may be mounted on the surface 329 of the elongate drum 122 at different angles such that the central axis 318 is not parallel to the direction of rotation "R", but is disposed at any angle from 0 to 90° with respect to the direction of rotation "R". Even further, the finger support 204 may be configured such that the swivel member 302 has a variety of other shapes such as a tapered cylinder, an ovoid, a lozenge, or other shape.

We claim:

1. A finger support (204) mounted on a surface of an elongate hollow drum (126, 128, 130) of a drum conveyor (112) for slidably receiving a conveyor finger (124) projecting outwardly through an aperture in a wall of the drum, wherein the finger (124) is supported at one end within the elongate drum (122), the finger support (204) comprising:

a base plate (300) configured to be mounted on, and being fixed to a surface of the wall of the elongate drum (122) in spanning relationship to the aperture;

a cover plate (304) fixed to the base plate (300); and a swivel member (302) disposed between the base plate (300) and the cover plate (304);

wherein the swivel member (302) is constrained by the base plate (300) and the cover plate (304) to rotate with respect to the base plate (300) and the cover plate (304) about an axis (318);

wherein said swivel member contains an aperture (320) configured and oriented for slidably receiving the conveyor finger (124) projecting outward through the aperture in the wall of the drum spanned by the base plate (300);

wherein the elongate drum (122) is configured to rotate in a first direction (R) about a horizontal rotational axis (202), and further wherein the axis (318) is disposed crosswise to the axis (202); and wherein the elongate drum includes a cylindrical center portion (126) having opposite ends respectively joined to outwardly converging conical end portions (128, 130), wherein the one end of the finger (124) is supported within one of the conical end portions (128, 130) for rotating about a horizontal axis (201) extending parallel to the rotational axis (202) and being co-planar with, and spaced in a direction of travel (V) from, the rotational axis (202), wherein the finger support (204) is fixed to one of the conical end portions (128, 130) of the elongate drum (122), and further wherein the finger support (204) supports the finger (124) so as to be angled toward an adjacent end of the drum (122) at an angle (F) with respect to the rotational axis (202) of the elongate drum (122) and further wherein the angle (F) is acute throughout an entire rotation of the elongate drum (122) and varies continuously between two angular limits as the elongate drum (122) rotates between a front position (B), wherein the finger support (204) faces forward, with the supported finger (124) being at a front location relative to the direction of travel (V), and a rear position (A), wherein the finger support (204) faces rearward, with the supported finger 124 being at a rear location relative to the direction of travel (V).

2. The finger support (204) of claim 1, wherein the swivel member (302) is in the form of an elongate body comprising a central region (312) and opposite end regions (314 and 316) and wherein the base plate (300) cooperates with the cover plate (304) to constrain the swivel member (302) by constraining only the opposite end regions (314) and (316) of the swivel member (302).

3. The finger support (204) of claim 2, wherein the central region (312) of the swivel member (302) contains the aperture (320) which is configured to receive and support the conveyor finger (124).

4. The finger support (204) of claim 3, wherein the base plate (300) comprises a first cradle (326) and the cover plate (304) comprises a second cradle (332) and further wherein the end region (314) is received within, and constrained by, the first cradle (326) and the second cradle (332).

5. The finger support (204) of claim 4, wherein the base plate (300) comprises a third cradle (328) and the cover plate comprises a fourth cradle (334), and further wherein the end region (316) is received within, and constrained by, the third cradle (328) and the fourth cradle (334).

6. The finger support (204) of claim 1, wherein at least one of the base plate (300), the swivel member (302), and the cover plate (304) comprises plastic.

7. The finger support (204) of claim 6, wherein the swivel member (302) is comprised of plastic.

8. The finger support (204) of claim 6, wherein the base plate (300) is comprised of plastic.

9. The finger support (204) of claim 1, wherein the angle (F) is smallest when the finger support (204) faces forward, and wherein the angle (F) is largest when the finger support (204) faces rearward.

* * * * *